US010810422B2

(12) United States Patent
Zhou et al.

(10) Patent No.: US 10,810,422 B2
(45) Date of Patent: Oct. 20, 2020

(54) METHOD FOR IRIS RECOGNITION AND RELATED PRODUCTS

(71) Applicant: Guangdong Oppo Mobile Telecommunications Corp., Ltd., Dongguan, Guangdong (CN)

(72) Inventors: Yibao Zhou, Guangdong (CN); Xueyong Zhang, Guangdong (CN); Cheng Tang, Guangdong (CN); Haitao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 172 days.

(21) Appl. No.: 16/025,521

(22) Filed: Jul. 2, 2018

(65) Prior Publication Data
US 2019/0019024 A1  Jan. 17, 2019

(30) Foreign Application Priority Data

Jul. 17, 2017 (CN) .......................... 2017 1 0582645

(51) Int. Cl.
*G06K 9/00* (2006.01)
*G06K 9/22* (2006.01)
(Continued)

(52) U.S. Cl.
CPC ......... *G06K 9/00617* (2013.01); *G06F 21/32* (2013.01); *G06F 21/83* (2013.01);
(Continued)

(58) Field of Classification Search
CPC .......... G06K 9/00604; G06K 9/00617; G06K 9/0061; G06K 9/00597; G06K 9/00899;
(Continued)

(56) References Cited

U.S. PATENT DOCUMENTS 9,058,765 B1 * 6/2015 Mallick ................. G06F 3/0482
2009/0103784 A1 * 4/2009 Forutanpour ............. G06T 7/90
382/117

(Continued)

FOREIGN PATENT DOCUMENTS

CN  105138996 A  12/2015
CN  105303085 A  2/2016
(Continued)

OTHER PUBLICATIONS

International search report issued in corresponding international application No. PCT/CN2018/088892 dated Aug. 29, 2018.
(Continued)

*Primary Examiner* — Jingge Wu

(57) ABSTRACT

A method for iris recognition performed by related products includes the following. A mobile terminal collects a target black-and-white iris image through an iris camera and collects a target color iris image through a front camera, when an iris collecting instruction is received. The target color iris image is displayed in an iris recognition area of a display screen, where the target color iris image is configured to hint a user that the mobile terminal is performing iris recognition. The target black-and-white iris image is processed for iris recognition.

14 Claims, 9 Drawing Sheets

(51) Int. Cl.
*G06F 21/83* (2013.01)
*G06F 21/32* (2013.01)
(52) U.S. Cl.
CPC ..... *G06K 9/00302* (2013.01); *G06K 9/00597* (2013.01); *G06K 9/00604* (2013.01); *G06K 9/00899* (2013.01); *G06K 9/00919* (2013.01); *G06K 9/22* (2013.01)
(58) Field of Classification Search
CPC .......... G06K 9/00067; G06K 9/00221; G06K 9/00302; G06K 9/22; G06F 21/83; G06F 21/32; G06F 3/013; G06F 21/30; G06F 21/31
See application file for complete search history.

(56) References Cited

U.S. PATENT DOCUMENTS

| | | | | |
|---|---|---|---|---|
| 2009/0279790 A1* | 11/2009 | Burge | ................ | G06K 9/00604 382/209 |
| 2010/0272327 A1* | 10/2010 | Silveira | ................ | G02B 26/06 382/117 |
| 2011/0224509 A1* | 9/2011 | Fish | ................ | G06F 21/32 600/301 |
| 2012/0044369 A1* | 2/2012 | Irisawa | ................ | H04N 9/045 348/208.4 |
| 2012/0081282 A1* | 4/2012 | Chin | ................ | G06F 3/011 345/156 |
| 2016/0092720 A1* | 3/2016 | Lee | ................ | G06K 9/00604 348/78 |
| 2016/0110601 A1* | 4/2016 | Son | ................ | G06K 9/00912 382/117 |
| 2016/0180169 A1 | 6/2016 | Bae et al. | | |
| 2017/0011250 A1* | 1/2017 | Gill | ................ | G06K 9/00617 |
| 2017/0215071 A1* | 7/2017 | Jayanthi | ............. | H04N 5/44504 |
| 2018/0132775 A1* | 5/2018 | Ohayon | ............... | G06T 7/0014 |
| 2018/0165437 A1* | 6/2018 | Shim | ................ | G06K 9/00342 |

FOREIGN PATENT DOCUMENTS

| | | |
|---|---|---|
| CN | 105354509 A | 2/2016 |
| CN | 105931178 A | 9/2016 |
| CN | 106934269 A | 7/2017 |

OTHER PUBLICATIONS

Christian Rathgeb et al:"Iris Biometric: From segmentation to template security—Chapter 2: Iris biometric processing" In: "Iris Biometric: From segmentation to template security—Chapter 2: Iris biometric processing", Dec. 12, 2013 (Dec. 12, 2013), XP055528390, p. 7, 13-15.

Anil K. Jain et al:"Introduction to biometrics—Chapter 4: Iris recognition" In:"Introduction to Biometrics", Dec. 10, 2011 (Dec. 10, 2011), Springer Science+Business Media, New York, XP055528366, p. 144; figure 43; Section 4.6; p. 161.

Partial European search report issued in corresponding European application No. 18175706.3 dated Dec. 6, 2018.

Examination report No. 1 for standard patent application issued in corresponding AU application No. 2018301992 dated May 27, 2020.

* cited by examiner

METHOD FOR IRIS RECOGNITION AND RELATED PRODUCTS

CROSS-REFERENCE TO RELATED APPLICATION(S)

This application claims priority to Chinese Patent Application No. 201710582645.4, filed on Jul. 17, 2017, the content of which is hereby incorporated by reference in its entirety.

TECHNICAL FIELD

This disclosure relates to the field of mobile terminal technology, and particularly to a method for iris recognition and related products.

BACKGROUND

With the popularization of mobile terminals such as mobile phones, tablet computers, and the like, people in modern life basically have a mobile phone. In order to ensure security of mobile phones, biometric recognition technologies such as fingerprint recognition, iris recognition, and the like are generally adopted in current mobile phones. Among them, iris recognition has been widely used in mobile phone unlock, mobile payment, and other aspects because of a high degree of anti-counterfeiting, being difficult to be cracked, and other advantages.

Since the iris in the human eye is located between the black pupil and the white pupil, the iris pigment can only show specific characteristics in near-infrared light. Therefore, current iris recognition generally uses infrared iris cameras to collect iris images. Since the iris camera does not collect visible light, the iris image collected is a black-and-white image. During iris recognition, an iris recognition area is displayed on a display screen of a mobile phone to guide a user to perform eyeball positioning. After the eyeball positioning on the user is completed, black-and-white iris images captured through the iris camera will be displayed in the iris recognition area. However, black-and-white iris images have a single display color.

SUMMARY

Disclosed herein are implementations of a method for iris recognition and related products, to enrich display colors of an iris image displayed on a display screen and improve display effect of the iris image.

According to a first aspect of the implementations of the disclosure, a method for iris recognition is provided. The method includes the following.

A target black-and-white iris image is collected through an iris camera and a target color iris image is collected through a front camera, when an iris collecting instruction is received.

The target color iris image is displayed in an iris recognition area of a display screen, where the target color iris image is configured to hint a user that a mobile terminal is performing iris recognition.

The target black-and-white iris image is processed for iris recognition.

According to a second aspect of the implementations of the disclosure, a mobile terminal is provided. The mobile terminal includes an iris camera, a front camera, a display screen, and an application processor (AP).

The iris camera is configured to collect a target black-and-white iris image when an iris collecting instruction is received.

The front camera is configured to collect a target color iris image when the iris collecting instruction is received.

The display screen is configured to display the target color iris image in an iris recognition area of the display screen, where the target color iris image is configured to hint a user that the mobile terminal is performing iris recognition.

The application processor (AP) is configured to process the target black-and-white iris image for iris recognition.

According to a third aspect of the implementations of the disclosure, a mobile terminal is provided. The mobile terminal includes an iris camera, a front camera, a display screen, an application processor (AP), and a memory. The memory is configured to store one or more programs. The one or more programs are configured to be executed by the AP. The programs include instructions operable to execute the following operations.

Receive an iris collecting instruction.

A target black-and-white iris image is collected through the iris camera and a target color iris image is collected through the front camera, when an iris collecting instruction is received.

The target color iris image is displayed in an iris recognition area of the display screen, where the target color iris image is configured to hint a user that a mobile terminal is performing iris recognition.

The target black-and-white iris image is processed for iris recognition.

According to a fourth aspect of the implementations of the disclosure, a mobile terminal is provided. The mobile terminal includes a collecting unit, a displaying unit, a processing and verifying unit, and a determining unit.

The collecting unit is configured to collect a target black-and-white iris image through an iris camera when an iris collecting instruction is received.

The collecting unit is further configured to collect a target color iris image through a front camera when the iris collecting instruction is received.

The displaying unit is configured to display the target color iris image in an iris recognition area of a display screen, where the target color iris image is configured to hint a user that the mobile terminal is performing iris recognition.

The processing and verifying unit is configured to process the target black-and-white iris image to verify whether the target black-and-white iris image is a legal iris image.

The determining unit is configured to determine that the iris recognition is successful when the processing and verifying unit verifies that the target black-and-white iris image is the legal iris image.

According to a fifth aspect of the implementations of the disclosure, a computer readable storage medium is provided. The computer readable storage medium is configured to store computer programs for electronic data interchange. The computer programs are operable with a computer to execute all or part of the operations described in any method in the first aspect of the implementations of the disclosure.

According to a sixth aspect of the implementations of the disclosure, a computer program product is provided. The computer program product includes a non-transitory computer-readable storage medium that stores computer programs. The computer programs can be operable with a computer to execute all or part of the operations described in any method in the first aspect of the implementations of the disclosure.

BRIEF DESCRIPTION OF THE DRAWINGS

To describe technical solutions in the implementations of the present disclosure more clearly, the following briefly introduces the accompanying drawings required for describing the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompanying drawings of the present disclosure are used to distinguish different objects rather than describe a particular order. The terms "include", "comprise", and "have" as well as variations thereof are intended to cover a non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The mobile terminal involved in the implementations of the present disclosure may include various handheld devices, in-vehicle devices, wearable devices, computing devices that have wireless communication functions or other processing devices connected to the wireless modem, as well as various forms of user equipment (UE), mobile stations (MS), terminal devices, and the like. For the convenience of description, the above-mentioned devices are collectively referred to as a mobile terminal.

Hereinafter, the implementations of the disclosure will be interpreted in detail.

Figure 1A:
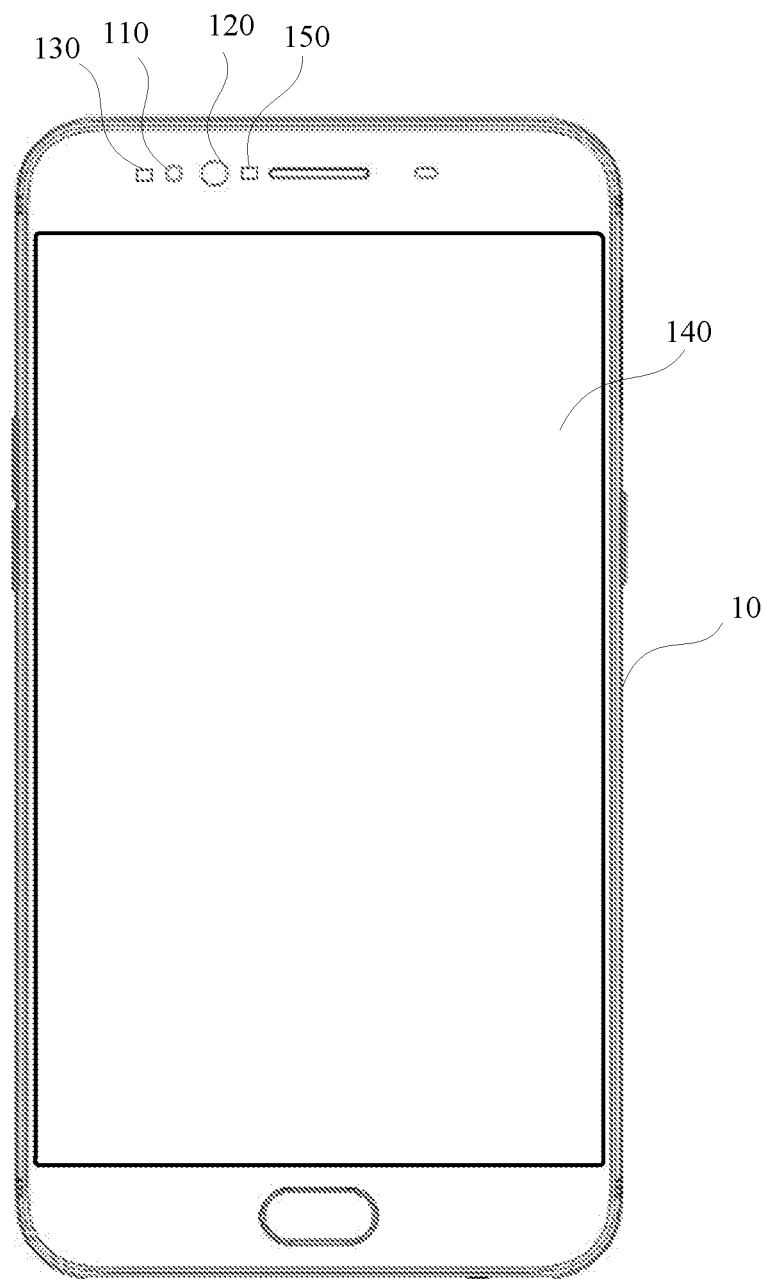
FIG. 1A is a schematic operating principle diagram of iris recognition according to an implementation of the present disclosure.

To understand the implementations of the disclosure more clearly, an operating principle of iris recognition of the implementations of the disclosure will be introduced first. FIG. 1A is a schematic operating principle diagram of iris recognition according to an implementation of the present disclosure. The iris recognition of FIG. 1A is applicable to a mobile terminal. The following describes a mobile phone as an example of the mobile terminal. As illustrated in FIG. 1A, an iris camera 110, a front camera 120, an infrared flashlight 130, and a display screen 140 are configured on the front of a mobile phone 10. The iris camera 110 is configured to collect a black-and-white iris image(s) (also known as a grayscale image). The front camera 120 is configured to collect a color iris image(s). The black-and-white iris image is configured to be processed by an application processor (AP) and the processed black-and-white iris image is configured to be verified in the background. When verification is passed, it means that the iris recognition is successful. The color iris image is configured to be displayed on the display screen 140. The display screen 140 can be a touch screen. The black-and-white iris image refers to an iris image with gray colors such as black and white. The color iris image refers to an iris image with colors of red, orange, yellow, green, cyan, blue, purple, and the like. The color iris image can provide users with rich colors, enrich display colors of iris images displayed on the display screen 140, and improve display effect of the iris images.

As one implementation, a visible flashlight 150 may also be configured on the front of the mobile phone 10. The visible flashlight 150 is enabled when the iris camera 110 and the front camera 120 are operating. The visible flashlight 150 is configured to assist in determining whether an object under iris recognition is a living body.

Figure 1B:
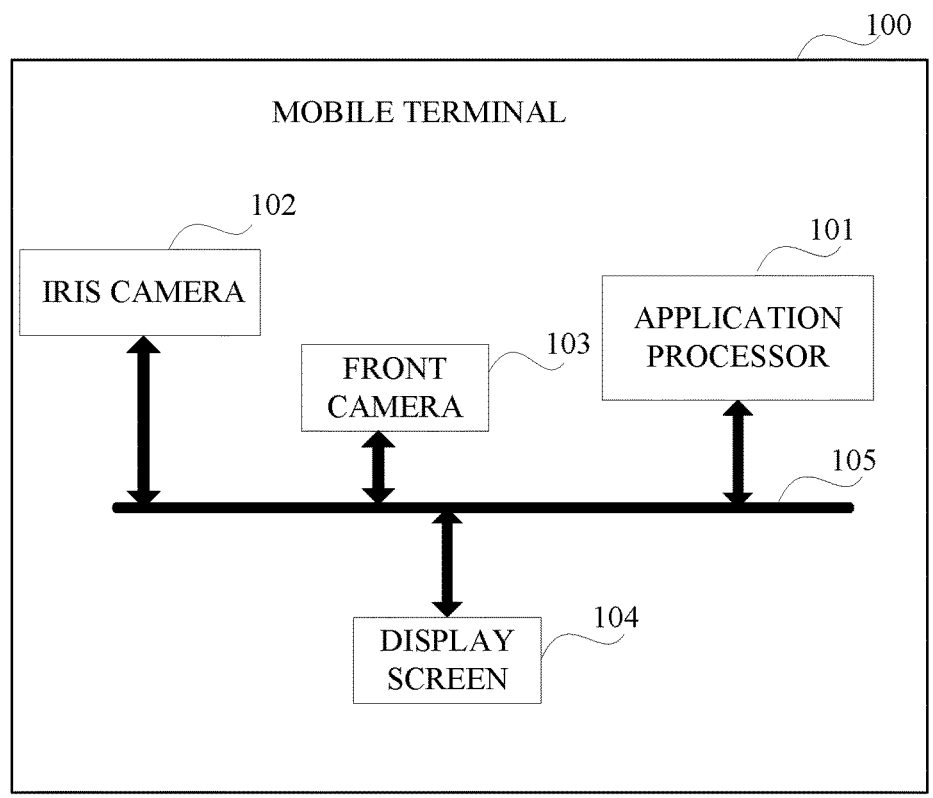
FIG. 1B is a schematic structural diagram illustrating a mobile terminal according to an implementation of the present disclosure.

FIG. 1B is a schematic structural diagram illustrating a mobile terminal according to an implementation of the present disclosure. As illustrated in FIG. 1B, the mobile terminal 100 includes an application processor (AP) 101, an iris camera 102, a front camera 103, and a display screen 104. The AP 101 is connected with the iris camera 102, the front camera 103, and the display screen 104 via a bus 105.

The iris camera 102 is configured to collect a target black-and-white iris image when the mobile terminal 100 receives an iris collecting instruction.

In the implementation of the disclosure, the mobile terminal 100 can receive the iris collecting instruction triggered to be generated in response to an input operation of a user. For example, the display screen 104 is a touch screen and an application scenario is screen unlock, in this case, after the display screen 104 is lit up (in other words, screen-on), a selection prompt box may be popped up on the display screen 104, where the selection prompt box is configured to guide the user to select one recognition from iris recognition, fingerprint recognition, and face recognition. When the user clicks to select "iris recognition" in the selection prompt box, generation of the iris collecting instruction is triggered. The mobile terminal 100 can also be triggered to generate the iris collecting instruction upon detecting that the user picks up the mobile terminal 100. For example, the application scenario is screen unlock, in this case, when a gesture sensor of the mobile terminal 100 (for example, a gravity sensor, a triaxial gyro, a triaxial acceleration sensor, or the like) detects that the user has an action of lifting the mobile terminal 100, the mobile terminal 100 is triggered to generate the iris collecting instruction.

The iris camera 102 is configured to collect the target black-and-white iris image. The target black-and-white iris image refers to an iris image captured through the iris camera 102 and meets the requirements. The iris image that meets the requirements refers to an iris image containing an image of a complete iris. A visible light filter may be disposed on the iris camera 102 to filter out visible light in ambient light. When the iris camera 102 captures an iris image, a front infrared flashlight may be used to fill light to obtain a clear black-and-white iris image.

The front camera 103 is configured to collect a target color iris image when the mobile terminal 100 receives the iris collecting instruction.

In the implementation of the disclosure, when the mobile terminal 100 receives the iris collecting instruction, the iris camera 102 and the front camera 103 operate simultaneously. The iris camera 102 collects the target black-and-white iris image, and the front camera 103 collects the target color iris image. Since the iris camera 102 and the front camera 103 operate simultaneously, the difference between an iris image acquired by the iris camera 102 and an iris image acquired by the front camera 103 lies in color and there is no big difference in details of the iris images. That is, the target color iris image displayed in an iris recognition area of the display screen 104 and the target black-and-white iris image processed to be verified by the AP 101 in the background are only different in color. Therefore, the target color iris image is more vivid and in line with the user's sensory experiment, thereby improving user experience.

The AP 101 is configured to process the target black-and-white iris image for iris recognition. For example, the AP 101 is configured to process to verify the target black-and-white iris image. When verification is passed, for example, when the target black-and-white iris image is a legal iris image, it means that the iris recognition is successful. A color iris image is configured to be displayed on the display screen 104. The color iris image can provide the user with rich colors, enrich display colors of iris images displayed on the display screen 104, and improve display effect of the iris images.

The display screen 104 is configured to display the target color iris image in the iris recognition area of the display screen 104, where the target color iris image is configured to hint the user that the mobile terminal 100 is performing iris recognition.

The iris recognition area can be displayed on the display screen 104 and is configured to guide the user to perform eyeball positioning. After completing the user's eyeball positioning, color iris images captured through the front camera 103 will be displayed in the iris recognition area. The iris recognition area can be displayed differently. For example, the iris recognition area has a color that is different from that of other parts of the display screen; alternatively, in the iris recognition area, text can be used to identify this area as the iris recognition area. The iris recognition area may be in the shape of a circle, a rectangle, a polygon, or the like. Two iris recognition areas may be configured for guiding the user to adjust a distance between the mobile terminal 100 and a face of the user, such that an image of one eyeball of the user falls within one iris recognition area and an image of the other eyeball of the user falls within the other iris recognition area. When the image of the one eyeball of the user falls within the one iris recognition area and the image of the other eyeball of the user falls within the other iris recognition area, the target color iris images collected through the front camera 103 are displayed in the iris recognition areas of the display screen 104. The color iris image can give the user a feeling of vivid. Compared with the black-and-white iris image, the color iris image can enrich the display colors of the iris images displayed on the display screen 104 and improve the display effect of the iris images.

After the iris camera 102 collects the target black-and-white iris image, the collected target black-and-white iris image can be sent to the AP 101 to be processed. The AP 101 is configured to process the target black-and-white iris image for iris recognition.

For example, the AP 101 is configured to verify whether the target black-and-white iris image is a legal iris image. The AP 101 is further configured to determine that the iris recognition is successful when the target black-and-white iris image is the legal iris image.

The AP 101 can process the target black-and-white iris image to verify whether the target black-and-white iris image is the legal iris image as follows. The AP 101 extracts iris feature points of the target black-and-white iris image and encodes the iris feature points to obtain an iris feature code(s). The AP 101 compares the iris feature code with a pre-stored iris feature code(s). The AP 101 determines that the target black-and-white iris image is the legal iris image when the iris feature code matches the pre-stored iris feature code. The AP 101 determines that the target black-and-white iris image is not the legal iris image when the iris feature code does not match the pre-stored iris feature code. When the target black-and-white iris image is the legal iris image, the AP 101 determines that the iris recognition is successful. On the other hand, when the target black-and-white iris image is not the legal iris image, the AP 101 determines that the iris recognition is failed.

As one implementation, the front camera 103 is further configured to collect a face image of the user during collecting the target color iris image. The AP 101 is further configured to analyze a facial expression of the user corresponding to the face image of the user. The display screen 104 is further configured to display a background animation corresponding to the facial expression of the user in a background area of the display screen 104 during displaying the target color iris image in the iris recognition area of the display screen 104, where the iris recognition area does not overlap with the background area.

According to the implementation of the disclosure, a displaying area on the display screen 104 can be divided into the iris recognition area and the background area, where the iris recognition area is configured to display the color iris image and the background area is configured to display a background picture or a background animation. Moreover, the face image of the user can be collected during collecting the iris image of the user, and then the facial expression of the user can be analyzed according to the face image of the user, where different facial expressions of the user can correspond to different background animations. The AP 101 analyzes the facial expression of the user corresponding to the face image of the user as follows. The AP 101 adopts image processing methods to extract facial features such as eyes, nose, face, and mouth in the face image of the user, compares the extracted facial features with facial expressions of the user in an expression library of the user, and determines a facial expression of the user having the highest comparing degree in the expression library of the user as the facial expression of the user corresponding to the face image of the user. The expression library of the user includes a plurality of facial expressions of the user that are collected in advance. The facial expression of the user may include "excited", "happy", "frustrated", "angry", and the like. Different facial expressions of the user may correspond to different background animations, for example, "angry" corresponds to warm-like animations, "frustrated" corresponds to inspirational animations, and "happy" corresponds to landscape wallpapers. According to the implementation of the disclosure, the background animation corresponding to the facial expression of the user can be displayed in the background area of the display screen 104, complying with the user's mood, such that user experience can be improved.

Figure 1C:
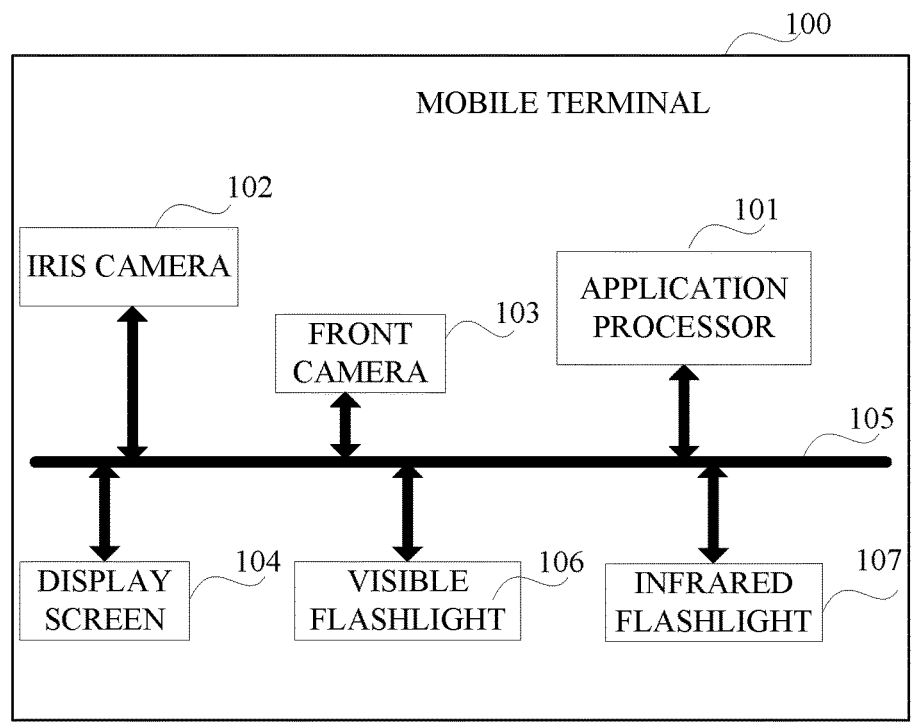
FIG. 1C is a schematic structural diagram illustrating another mobile terminal according to an implementation of the present disclosure.

As illustrated in FIG. 1C, the mobile terminal 100 further includes a visible flashlight 106. With such structure, the front camera 103 collects the target color iris image as follows.

The front camera 103 captures a first color iris image when the visible flashlight 106 is at a first power and captures a second color iris image when the visible flashlight 106 is at a second power, where the first power is different from the second power.

The AP 101 is further configured to determine whether a first absolute value of a difference between an eyeball area ratio in the first color iris image and an eyeball area ratio in the second color iris image is greater than a first preset threshold.

The AP 101 is further configured to determine an image with a larger eyeball area ratio from the first color iris image and the second color iris image as the target color iris image based on a determination that the first absolute value is greater than the first preset threshold.

The AP 101 is further configured to output to the display screen 104 a hint message indicating that an object under recognition is not a living body based on a determination that the first absolute value is less than the first preset threshold, where the prompt message is configured to hint the user that the object under recognition is not a living body.

According to the implementation of the disclosure, the front camera 103 can collect the first color iris image when the visible flashlight 106 is at the first power and collect the second color iris image when the visible flashlight 106 is at the second power. The AP 101 can recognize the eyeball area ratio in the first color iris image and the eyeball area ratio in the second color iris image. The visible flashlight 106 is used to emit light visible to human eyes, light emission intensities are different when the visible flashlight 106 is at different powers and accordingly, impacts on pupils of the eyes of the user are also different. The eyeball area ratio refers to a ratio of an area of an eyeball area in the color iris image to an area of the entire color iris image. The AP 101 determines whether the first absolute value of the difference between the eyeball area ratio in the first color iris image and the eyeball area ratio in the second color iris image is greater than the first preset threshold, so as to determine whether the object subjected to iris collection is a living body. If the object is a living body, when the visible flashlight 106 is at different powers, that is, when the visible flashlight 106 is in different light emission intensities, as the pupils of the human eyes will constrict under strong light, the eyeball area ratio in the first color iris image and the eyeball area ratio in the second color iris image will change greatly. In this situation, the first absolute value of the difference between the eyeball area ratio in the first color iris image and the eyeball area ratio in the second color iris image is greater than the first preset threshold. On the other hand, if the object is not a living body, for example, an eyeball of a dead body or a photo, when the visible flashlight 106 is at different powers, the eyeball area ratio in the first color iris image and the eyeball area ratio in the second color iris image will remain unchanged. In this situation, the first absolute value of the difference between the eyeball area ratio in the first color iris image and the eyeball area ratio in the second color iris image is less than the first preset threshold. With aid of the implementation of the disclosure, it is possible to determine whether the object subjected to iris collection is a living body by determining whether the eyeball area ratio in the color iris image captured by the front camera 103 is greater than the first preset threshold when the visible flashlight 106 is in different light emission intensities. Therefore, a simple the living body recognition scheme can be achieved.

In general, a larger eyeball area ratio indicates wider eyelids of the user, accordingly, more iris features can be collected; similarly, a smaller eyeball area ratio indicates narrower eyelids of the user, accordingly, less the iris features can be collected. According to the implementation of the disclosure, an image with the larger eyeball area ratio in the first color iris image and the second color iris image is determined as the target color iris image and the color iris image with the larger eyeball area ratio can be displayed on the display screen, further improving the user experience.

As one implementation, as illustrated in FIG. 1C, the mobile terminal 100 further includes an infrared flashlight 107. With this structure, the iris camera 102 collects the target black-and-white iris image as follows.

The iris camera 102 captures a first black-and-white iris image when the visible flashlight 106 is at the first power and when the infrared flashlight 107 fills light and captures a second black-and-white iris image when the visible flashlight 106 is at the second power and when the infrared flashlight 107 fills light.

The AP 101 is further configured to determine whether a second absolute value of a difference between an eyeball area ratio in the first black-and-white iris image and an eyeball area ratio in the second black-and-white iris image is greater than a second preset threshold.

The AP 101 is further configured to determine an image with a larger eyeball area ratio from the first black-and-white iris image and the second black-and-white iris image as the target black-and-white iris image, based on a determination that the second absolute value is greater than the second preset threshold.

The AP 101 is further configured to output to the display screen 104 a hint message indicating that an object under recognition is not a living body based on a determination that the second absolute value is less than the second preset threshold, where the hint message is configured to hint the user that the object under recognition is not a living body.

According to the implementation of the disclosure, since more iris features are contained in the black-and-white iris image with the larger eyeball area ratio, the black-and-white iris image with the larger eyeball area ratio is determined as the target black-and-white iris image to facilitate the AP 101 to extract more iris features from the target black-and-white iris image in subsequent process. As a result, the iris features can be compared more easily and a success rate of the iris recognition can be improved.

The infrared flashlight 107 is configured to emit infrared. The infrared flashlight 107 fills light to enhance a resolution of the black-and-white iris image captured by the iris camera 102. Consequently, more iris features can be contained in the black-and-white iris image captured, so as to facilitate iris feature comparison and improve the success rate of the iris recognition.

In this implementation, it is possible to determine whether the eyeball area ratio in the black-and-white iris image captured by the iris camera 102 is greater than the second preset threshold and further determine whether the object subjected to iris collection is a living body, with the visible flashlight 106 in different light emission intensities. Therefore, the living body recognition scheme is simple. In addition, the front camera and the iris camera are used to determine whether the object subjected to iris collection is a living body respectively. Liveness detection can be passed only when the front camera and the iris camera both determine that the object subjected to iris collection is a living body, thereby improving security of iris liveness detection.

With regard to the first preset threshold and the second preset threshold, they can be the same or different. The first preset threshold and the second preset threshold can be set in advance and stored in the non-transitory memory of the mobile terminal.

Figure 1D:
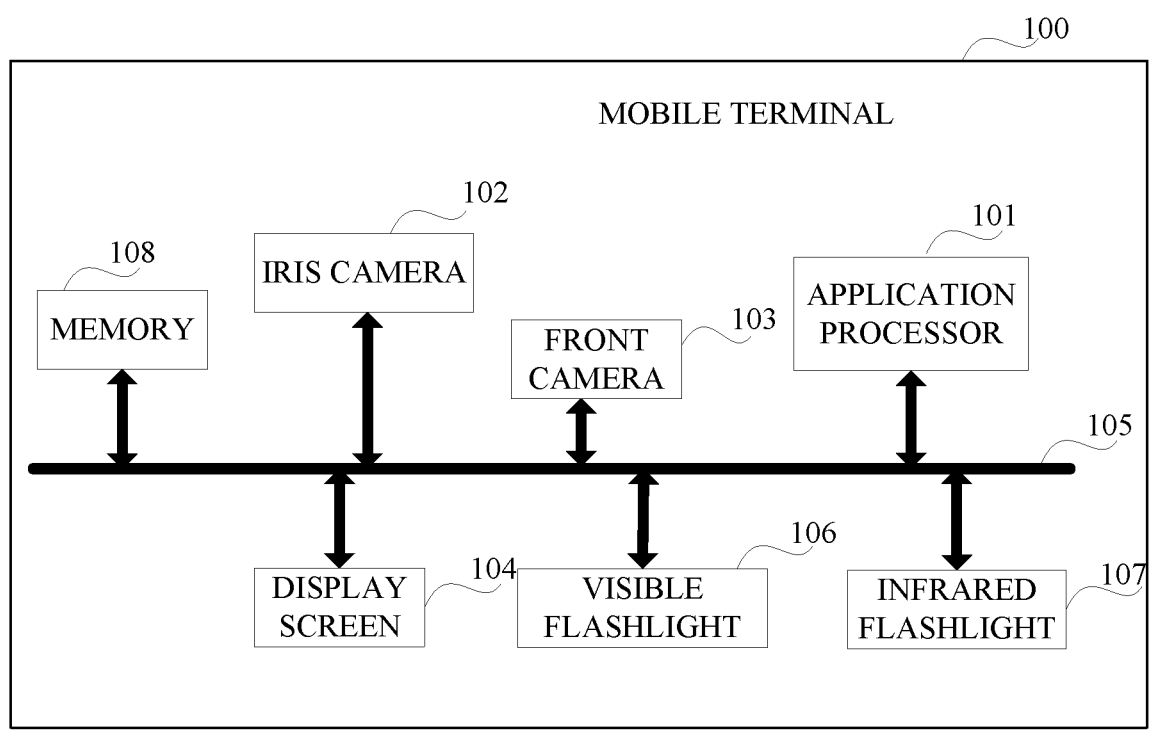
FIG. 1D is a schematic structural diagram illustrating yet another mobile terminal according to an implementation of the present disclosure.

As illustrated in FIG. 1D, the mobile terminal further includes a memory 108.

The iris camera 102 is further configured to collect an original black-and-white iris image when the mobile terminal 100 receives an iris enrolling instruction. The front camera 103 is further configured to collect an original color iris image when the mobile terminal 100 receives the iris enrolling instruction. The display screen 104 is further configured to display the original color iris image in the iris recognition area of the display screen 104, where the original color iris image is configured to hint the user that the mobile terminal 100 is performing iris enrolling. The AP 101 is further configured to process the original black-and-white iris image and store the processed original black-and-white iris image in the memory 108 of the mobile terminal 100. The stored original black-and-white iris image will be used for subsequent iris recognition for example.

According to the implementation of the disclosure, the original black-and-white iris image and the original color iris image are only different in color and there is no big difference in details of the original black-and-white iris image and the original color iris image. When the iris camera 102 collects the original black-and-white iris image, the infrared flashlight 107 can be configured to fill light to improve quality of the original black-and-white iris image collected. When the front camera 103 collects the original color iris image, whether the visible flashlight 106 is operated to fill light can be determined according to intensities of ambient light.

As one implementation, the iris camera 102 is further configured to collect a first original black-and-white iris image when the mobile terminal 100 receives the iris enrolling instruction. The front camera 103 is further configured to collect a first original color iris image when the mobile terminal 100 receives the iris enrolling instruction. The AP 101 is further configured to perform standardization on the first original black-and-white iris image to obtain a first standard original black-and-white iris image and perform the standardization on the first original color iris image to obtain a first standard original color iris image.

Since the same standardization is performed on both the first original black-and-white iris image and the first original color iris image, the first original color iris image that exactly corresponds to the first original black-and-white iris image collected by the iris camera 102 can be displayed on the display screen 104. The standardization mentioned herein includes pixel standardization, image size standardization, and the like.

The AP 101 is further configured to extract a first valid black-and-white iris area in the first standard original black-and-white iris image and determine a location of the first valid black-and-white iris area in the first standard original black-and-white iris image.

The AP 101 is further configured to determine a first valid color iris area in the first standard original color iris image according to the location of the first valid black-and-white iris area in the first standard original black-and-white iris image.

The display screen 104 is further configured to display the first valid color iris area in the first standard original color iris image in the iris recognition area of the display screen 104, where the first valid color iris area is configured to hint the user an iris feature area that has been enrolled by the mobile terminal 100.

A distribution of the first valid color iris area displayed on the display screen 104 in the first standard original color iris image is the same with that of the first valid black-and-white iris area processed by the AP 101 in the background in the first standard original black-and-white iris image. That is, the first valid color iris area and the first valid black-and-white iris area are totally the same in both size and shape.

The AP 101 is further configured to process the first valid black-and-white iris area and store the processed first valid black-and-white iris area (i.e., an image area) in the memory 108 of the mobile terminal 100.

The AP 101 is further configured to determine whether the first valid black-and-white iris area contains necessary iris features. The necessary iris feature can include interlaced spots, filaments, coronal, stripes, and crypts in the iris image. If the first valid black-and-white iris area contains necessary iris features, the iris enrolling is completed; otherwise, the iris camera 102 is further configured to collect a second original black-and-white iris image.

The front camera 103 is further configured to collect a second original color iris image.

The AP 101 is further configured to perform standardization on the second original black-and-white iris image to obtain a second standard original black-and-white iris image and perform the standardization on the second original color iris image to obtain a second standard original color iris image.

The AP 101 is further configured to extract a second valid black-and-white iris area in the second standard original black-and-white iris image and determine a location of the second valid black-and-white iris area in the second standard original black-and-white iris image.

The AP 101 is further configured to determine a second valid color iris area in the second standard original color iris image according to the location of the second valid black-and-white iris area in the second standard original black-and-white iris image.

The AP 101 is further configured to determine an overlapping area of the second valid color iris area and the first valid color iris area.

The display screen 104 is further configured to continue displaying on the display screen 104 an area of the second valid color iris area except the overlapping area.

The AP 101 is further configured to process the second valid black-and-white iris area and store the processed second valid black-and-white iris area in the memory 108 of the mobile terminal 100.

The AP 101 is further configured to determine whether the second valid black-and-white iris area contains the necessary iris features. If yes, the iris enrolling is completed; otherwise, the iris camera 102 is further configured to collect a third original black-and-white iris image. The iris enrolling will not complete until a valid black-and-white iris area containing the necessary iris features is collected by the iris camera 102.

The memory 108 can be a non-transitory memory.

The iris recognition in the implementation can be applied to scenes that need to be verified such as a screen unlock scene, a payment verification scene, and the like.

The mobile terminal illustrated in FIG. 1D can display color iris images on the display screen 104. Display colors of iris images displayed on the display screen 104 can be enriched and display effect of the iris images can be improved during collecting the iris images.

Figure 2:
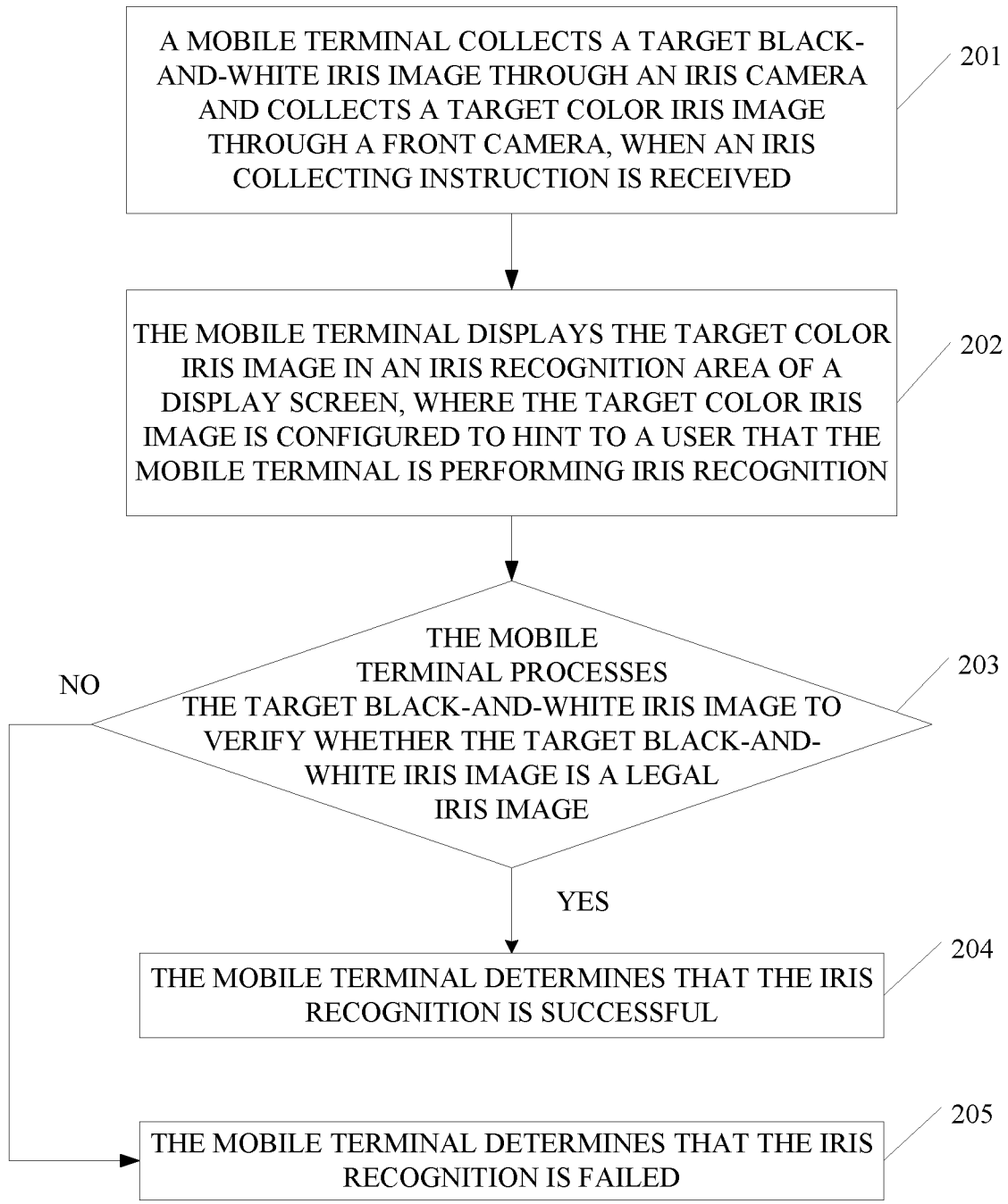
FIG. 2 is a schematic flow chart illustrating a method for iris recognition according to an implementation of the present disclosure.

FIG. 2 is a schematic flow chart illustrating a method for iris recognition according to an implementation of the present disclosure. The method is applicable to a mobile terminal including an iris camera, a front camera, a display screen, and an application processor (AP). In this method, a black-and-white iris image and a color iris image will be collected simultaneously by enabling both the iris camera and the front camera. As illustrated in FIG. 2, the method begins at 201.

At 201, the mobile terminal collects a target black-and-white iris image through the iris camera and collects a target color iris image through the front camera, when an iris collecting instruction is received.

At 202, the mobile terminal displays the target color iris image in an iris recognition area of the display screen, where the target color iris image is configured to hint a user that the mobile terminal is performing iris recognition.

At 203, the mobile terminal processes the target black-and-white iris image for iris recognition. As one implementation, the mobile terminal processes the target black-and-white iris image to verify whether the target black-and-white iris image is a legal iris image. If yes, proceed to 204; otherwise, proceed to 205.

At 204, the mobile terminal determines that the iris recognition is successful.

At 205, the mobile terminal determines that the iris recognition is failed.

Implementations of the method illustrated in FIG. 2 can refer to device-implementations illustrated in FIGS. 1B-1D. The disclosure will not be repeated herein.

According to the method illustrated in FIG. 2, the color iris image can be displayed on the display screen to enrich display colors of the iris image displayed on the display screen and improve display effect of the iris image.

Figure 3:
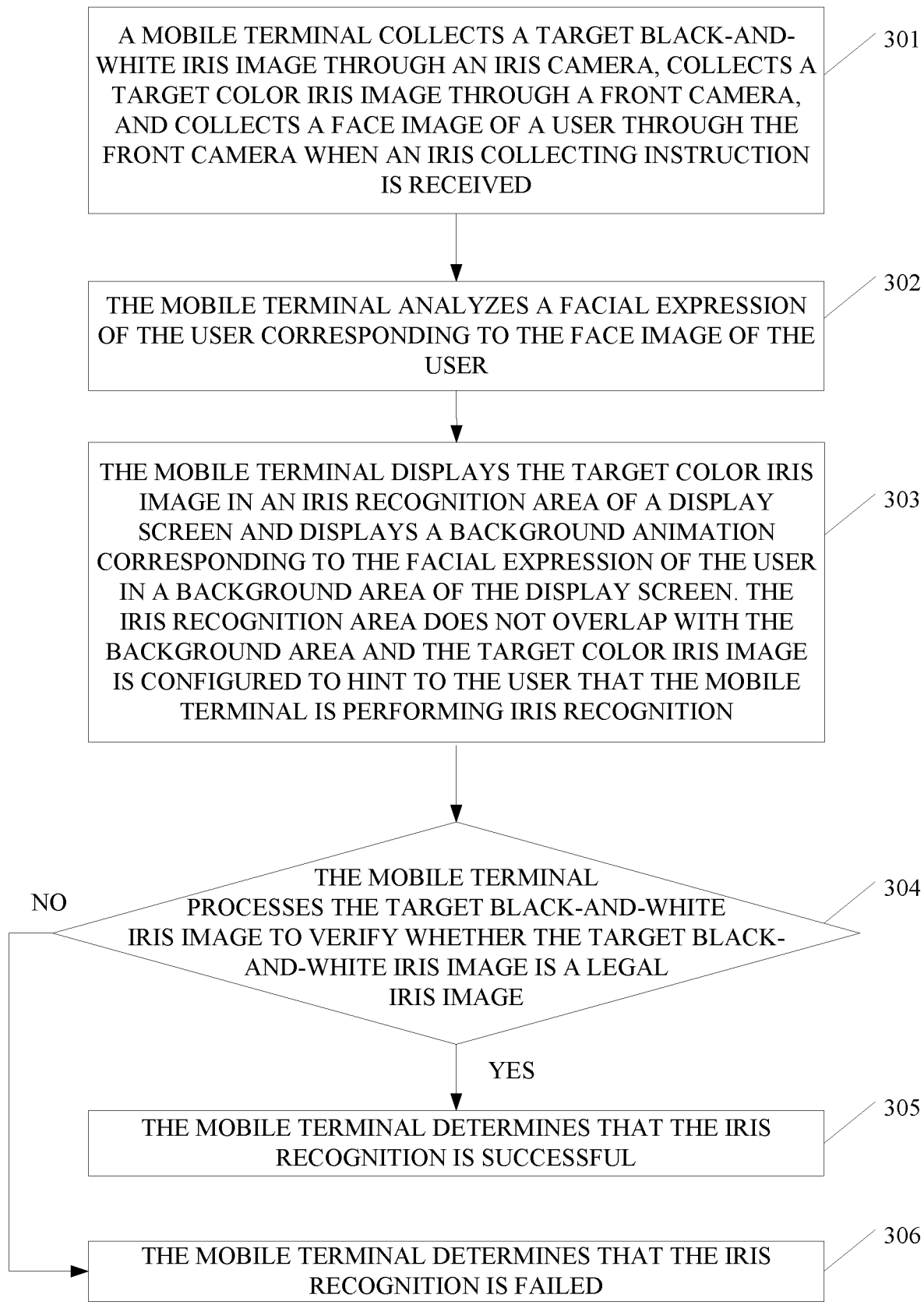
FIG. 3 is a schematic flow chart illustrating another method for iris recognition according to an implementation of the present disclosure.

FIG. 3 is a schematic flow chart illustrating another method for iris recognition according to an implementation of the present disclosure. The method is applicable to a mobile terminal including an iris camera, a front camera, a display screen, and an application processor (AP). The method begins at 301.

At 301, the mobile terminal collects a target black-and-white iris image through the iris camera, collects a target color iris image through the front camera, and collects a face image of a user through the front camera when an iris collecting instruction is received.

As one implementation, the mobile terminal further includes a visible flashlight. At 301, the mobile terminal collects the target color iris image through the front camera as follows.

The mobile terminal captures a first color iris image through the front camera when the visible flashlight is at a first power and captures a second color iris image through the front camera when the visible flashlight is at a second power, where the first power is different from the second power.

The mobile terminal determines whether a first absolute value of a difference between an eyeball area ratio in the first color iris image and an eyeball area ratio in the second color iris image is greater than a first preset threshold.

The mobile terminal determines an image with a larger eyeball area ratio from the first color iris image and the second color iris image as the target color iris image based on a determination that the first absolute value is greater than the first preset threshold.

As one implementation, the mobile terminal further includes an infrared flashlight. At 301, the mobile terminal collects the target black-and-white iris image through the iris camera as follows.

The mobile terminal captures a first black-and-white iris image through the iris camera when the visible flashlight is at the first power and when the infrared flashlight fills light and captures a second black-and-white iris image through the iris camera when the visible flashlight is at the second power and when the infrared flashlight fills light.

The mobile terminal determines whether a second absolute value of a difference between an eyeball area ratio in the first black-and-white iris image and an eyeball area ratio in the second black-and-white iris image is greater than a second preset threshold.

The mobile terminal determines an image with a larger eyeball area ratio from the first black-and-white iris image and the second black-and-white iris image as the target black-and-white iris image based on a determination that the second absolute value is greater than the second preset threshold.

At 302, the mobile terminal analyzes a facial expression of the user corresponding to the face image of the user.

At 303, the mobile terminal displays the target color iris image in an iris recognition area of the display screen and displays a background animation corresponding to the facial expression of the user in a background area of the display screen. The iris recognition area does not overlap with the background area and the target color iris image is configured to hint the user that the mobile terminal is performing iris recognition.

At 304, the mobile terminal processes the target black-and-white iris image for iris recognition. In one implementation, the mobile terminal processes the target black-andwhite iris image to verify whether the target black-and-white iris image is a legal iris image. If yes, proceed to 305; otherwise, proceed to 306.

At 305, the mobile terminal determines that the iris recognition is successful.

At 306, the mobile terminal determines that the iris recognition is failed.

Implementations of the method illustrated in FIG. 3 can refer to device-implementations illustrated in FIGS. 1B-1D. The disclosure will not be described in further details herein.

According to the method illustrated in FIG. 3, the color iris image can be displayed on the display screen, such that display colors of the iris image displayed on the display screen can be enriched and display effect of the iris image can be improved.

Figure 4:
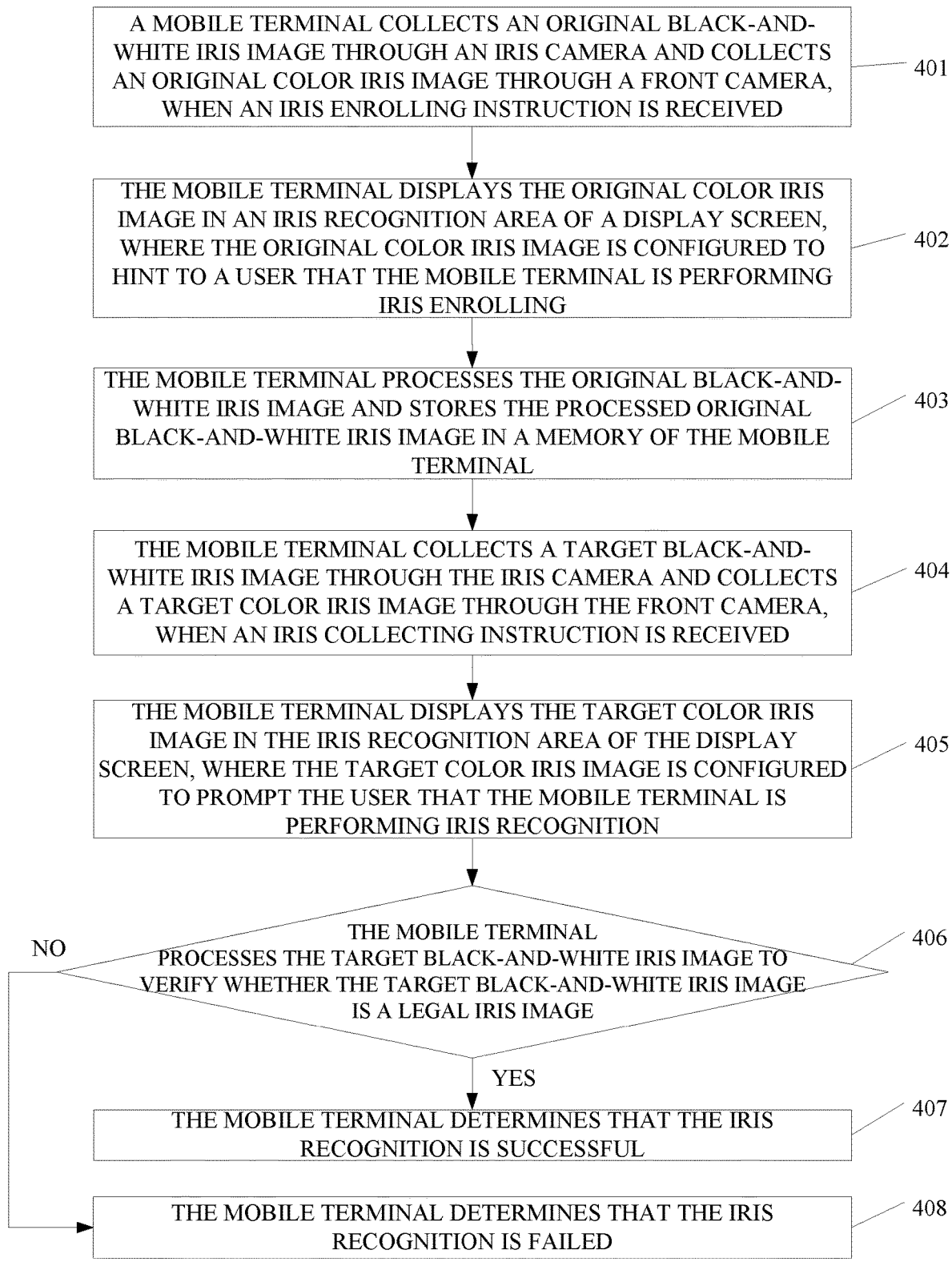
FIG. 4 is a schematic flow chart illustrating yet another method for iris recognition according to an implementation of the present disclosure.

FIG. 4 is a schematic flow chart illustrating yet another method for iris recognition according to an implementation of the present disclosure. The method is applicable to a mobile terminal including an iris camera, a front camera, a display screen, and an application processor (AP). The method begins at 401.

At 401, the mobile terminal collects an original black-and-white iris image through the iris camera and collects an original color iris image through the front camera, when an iris enrolling instruction is received.

At 402, the mobile terminal displays the original color iris image in an iris recognition area of the display screen, where the original color iris image is configured to hint a user that the mobile terminal is performing iris enrolling.

At 403, the mobile terminal processes the original black-and-white iris image and stores the processed original black-and-white iris image in a memory of the mobile terminal.

At 404, the mobile terminal collects a target black-and-white iris image through the iris camera and collects a target color iris image through the front camera, when an iris collecting instruction is received.

At 405, the mobile terminal displays the target color iris image in the iris recognition area of the display screen, where the target color iris image is configured to hint the user that the mobile terminal is performing iris recognition.

At 406, the mobile terminal processes the target black-and-white iris image for iris recognition. In one implementation, the mobile terminal processes the target black-and-white iris image to verify whether the target black-and-white iris image is a legal iris image. If yes, proceed to 407; otherwise, proceed to 408.

At 407, the mobile terminal determines that the iris recognition is successful.

At 408, the mobile terminal determines that the iris recognition is failed.

Implementations of the method illustrated in FIG. 4 can refer to device-implementations illustrated in FIGS. 1B-1D. The disclosure will not be elaborated herein.

According to the method illustrated in FIG. 4, the color iris image can be displayed on the display screen to enrich display colors of the iris image displayed on the display screen and improve display effect of the iris image during collecting the iris image.

Figure 5:
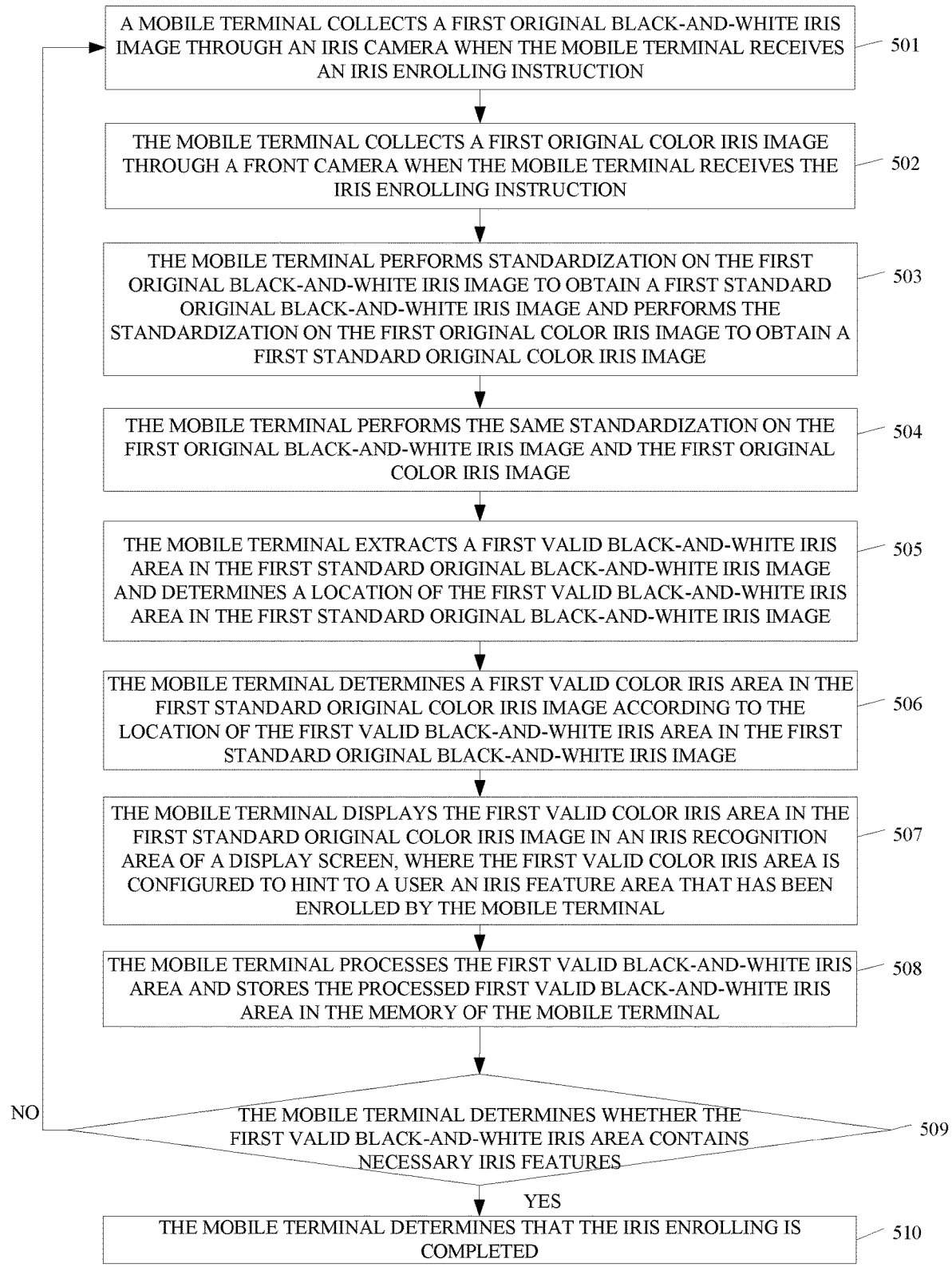
FIG. 5 is a schematic flow chart illustrating still another method for iris recognition according to an implementation of the present disclosure.

FIG. 5 is a schematic flow chart illustrating still another method for iris recognition according to an implementation of the present disclosure. The method is applicable to a mobile terminal including an iris camera, a front camera, a display screen, and an application processor (AP). The method begins at 501.

At 501, the mobile terminal collects a first original black-and-white iris image through the iris camera when the mobile terminal receives an iris enrolling instruction.

At 502, the mobile terminal collects a first original color iris image through the front camera when the mobile terminal receives the iris enrolling instruction.

At 503, the mobile terminal performs standardization on the first original black-and-white iris image to obtain a first standard original black-and-white iris image and performs the standardization on the first original color iris image to obtain a first standard original color iris image.

At 504, the mobile terminal performs the same standardization on the first original black-and-white iris image and the first original color iris image.

After 504, the first original color iris image that exactly corresponds to the first original black-and-white iris image collected by the iris camera can be displayed on the display screen.

The standardization herein includes pixel standardization, image size standardization, and the like.

At 505, the mobile terminal extracts a first valid black-and-white iris area in the first standard original black-and-white iris image and determines a location of the first valid black-and-white iris area in the first standard original black-and-white iris image.

At 506, the mobile terminal determines a first valid color iris area in the first standard original color iris image according to the location of the first valid black-and-white iris area in the first standard original black-and-white iris image.

At 507, the mobile terminal displays the first valid color iris area in the first standard original color iris image in an iris recognition area of the display screen, where the first valid color iris area is configured to hint the user an iris feature area that has been enrolled by the mobile terminal.

A distribution of the first valid color iris area displayed on the display screen in the first standard original color iris image is the same with that of the first valid black-and-white iris area processed by the AP in the background in the first standard original black-and-white iris image. That is, the first valid color iris area and the first valid black-and-white iris area are totally the same in size and shape.

At 508, the mobile terminal processes the first valid black-and-white iris area and stores the processed first valid black-and-white iris area in the memory of the mobile terminal.

At 509, the mobile terminal determines whether the first valid black-and-white iris area contains necessary iris features. If yes, proceed to 510; otherwise, proceed to 501.

At 510, the mobile terminal determines that the iris enrolling is completed.

The memory can be a non-transitory memory.

The iris recognition in the implementation can be applied to scenes that need to be verified such as a screen unlock scene, a payment verification scene, and the like.

Implementations of the method illustrated in FIG. 5 can refer to device-implementations illustrated in FIGS. 1B-1D. The disclosure will not be detailed repeatedly herein.

According to the method illustrated in FIG. 5, the color iris image can be displayed on the display screen, such that display colors of the iris image displayed on the display screen can be enriched and display effect of the iris image can be improved during collecting the iris image. During enrolling the iris, the color iris image that has been enrolled can be displayed on the display screen, thereby improving user experience.

Figure 6:
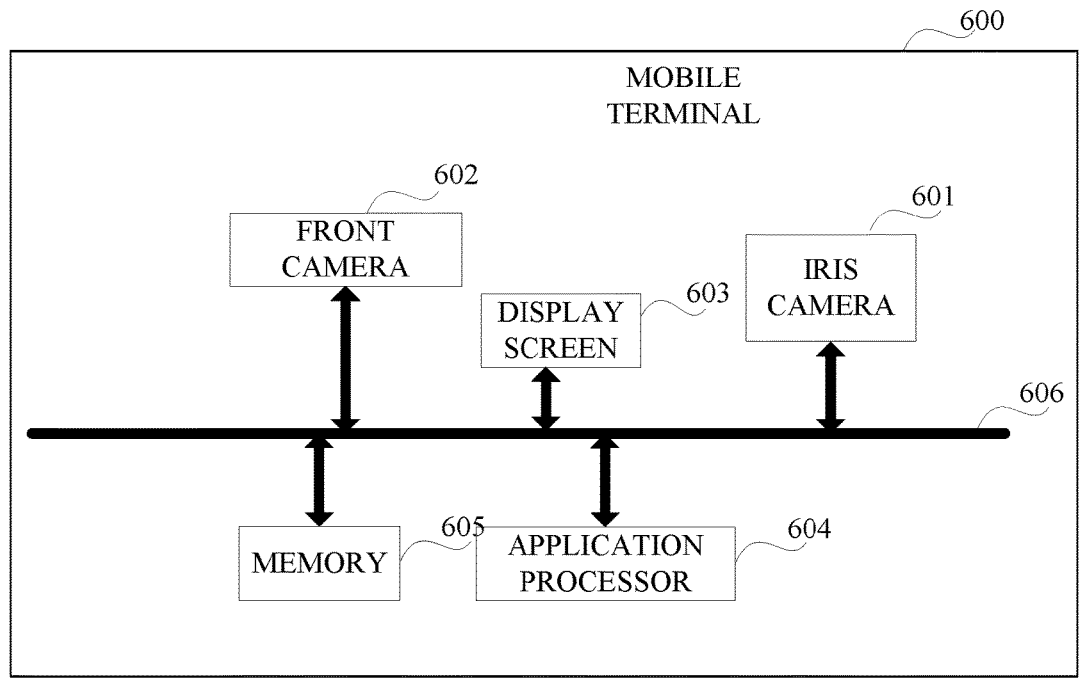
FIG. 6 is a schematic structural diagram illustrating still another mobile terminal according to an implementation of the present disclosure.

FIG. 6 is a schematic structural diagram illustrating still another mobile terminal according to an implementation of the present disclosure. The mobile terminal 600 includes an iris camera 601, a front camera 602, a display screen 603, an application processor (AP) 604, and a memory 605 which are connected via a communication bus 606. The memory 605 is configured to store one or more programs. The one or more programs are configured to be executed by the AP 604. The programs include instructions operable to execute the following operations.

An iris collecting instruction is received. A target black-and-white iris image is collected through the iris camera 601 and a target color iris image is collected through the front camera 602. The target color iris image is displayed in an iris recognition area of the display screen 603, where the target color iris image is configured to hint a user that the mobile terminal 600 is performing iris recognition. The target black-and-white iris image is processed for iris recognition. In one implementation, the target black-and-white iris image is processed to verify whether the target black-and-white iris image is a legal iris image, and the iris recognition is successful when the target black-and-white iris image is the legal iris image.

As one implementation, the programs further include instructions operable to execute the following operations.

A face image of the user is collected through the front camera 602 during collecting the target color iris image through the front camera 602.

A facial expression of the user corresponding to the face image of the user is analyzed.

A background animation corresponding to the facial expression of the user is displayed in a background area of the display screen 603 during displaying the target color iris image in the iris recognition area of the display screen 603, where the iris recognition area does not overlap with the background area.

As one implementation, the mobile terminal further includes a visible flashlight. The instructions operable to execute collecting the target color iris image through the front camera 602 are operable to execute the following operations.

A first color iris image is captured through the front camera 602 when the visible flashlight is at a first power and a second color iris image is captured through the front camera 602 when the visible flashlight is at a second power, where the first power is different from the second power.

Determine whether a first absolute value of a difference between an eyeball area ratio in the first color iris image and an eyeball area ratio in the second color iris image is greater than a first preset threshold.

An image with a larger eyeball area ratio from the first color iris image and the second color iris image is determined as the target color iris image based on a determination that the first absolute value is greater than the first preset threshold.

As one implementation, the mobile terminal further includes an infrared flashlight. In terms of collecting the target black-and-white iris image through the iris camera 601, the programs include instructions operable to execute the following operations.

A first black-and-white iris image is captured through the iris camera 601 when the visible flashlight is at the first power and when the infrared flashlight fills light. A second black-and-white iris image is captured through the iris camera 601 when the visible flashlight is at the second power and when the infrared flashlight fills light.

Determine whether a second absolute value of a difference between an eyeball area ratio in the first black-and-white iris image and an eyeball area ratio in the second black-and-white iris image is greater than a second preset threshold.

An image with a larger eyeball area ratio from the first black-and-white iris image and the second black-and-white iris image is determined as the target black-and-white iris image based on a determination that the second absolute value is greater than the second preset threshold.

As one implementation, the programs further include instructions operable to execute the following operations.

An original black-and-white iris image is collected through the iris camera 601 and an original color iris image is collected through the front camera 602, when the mobile terminal receives an iris enrolling instruction.

The original color iris image is displayed in the iris recognition area of the display screen 603, where the original color iris image is configured to hint the user that the mobile terminal is performing iris enrolling.

The original black-and-white iris image is processed and the processed original black-and-white iris image is stored in the memory 605.

According to the mobile terminal illustrated in FIG. 6, the color iris image can be displayed on the display screen 603 to enrich display colors of the iris image displayed on the display screen 603 and improve display effect of the iris image during collecting the iris image.

Figure 7:
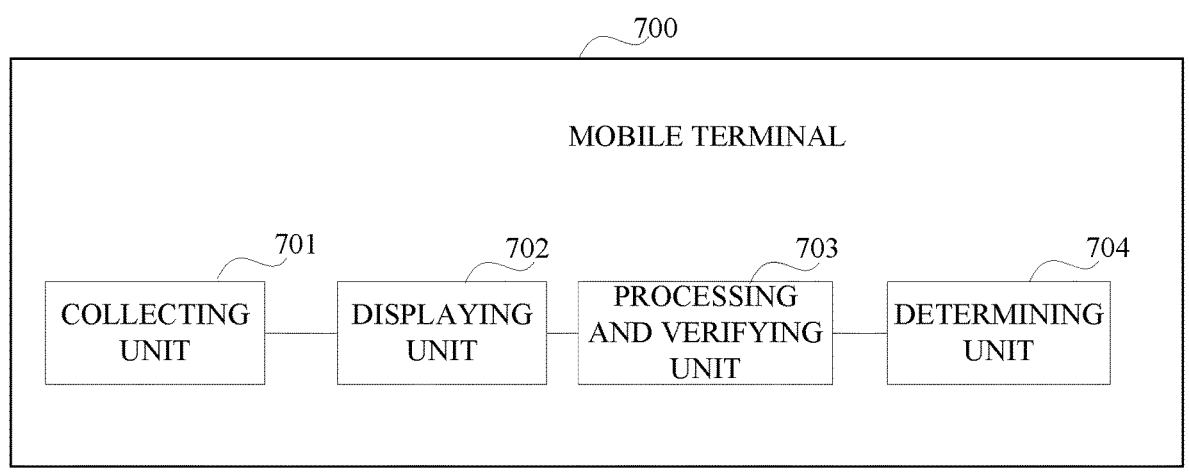
FIG. 7 is a schematic structural diagram illustrating still another mobile terminal according to an implementation of the present disclosure.

FIG. 7 is a schematic structural diagram illustrating still another mobile terminal according to an implementation of the present disclosure. The mobile terminal 700 includes a collecting unit 701, a displaying unit 702, a processing and verifying unit 703, and a determining unit 704.

The collecting unit 701 is configured to collect a target black-and-white iris image through an iris camera when an iris collecting instruction is received.

The collecting unit 701 is further configured to collect a target color iris image through a front camera when the iris collecting instruction is received.

The displaying unit 702 is configured to display the target color iris image in an iris recognition area of a display screen, where the target color iris image is configured to hint a user that the mobile terminal is performing iris recognition.

The processing and verifying unit 703 is configured to process the target black-and-white iris image to verify whether the target black-and-white iris image is a legal iris image.

The determining unit 704 is configured to determine that the iris recognition is successful when the processing and verifying unit 703 verifies that the target black-and-white iris image is the legal iris image.

Implementations of the mobile terminal can refer to method-implementations illustrated in FIGS. 2-5. The disclosure will not be repeated herein.

According to the mobile terminal illustrated in FIG. 7, the color iris image can be displayed on the display screen, such that display colors of the iris image displayed on the display screen can be enriched and display effect of the iris image can be improved during collecting the iris image.

Figure 8:
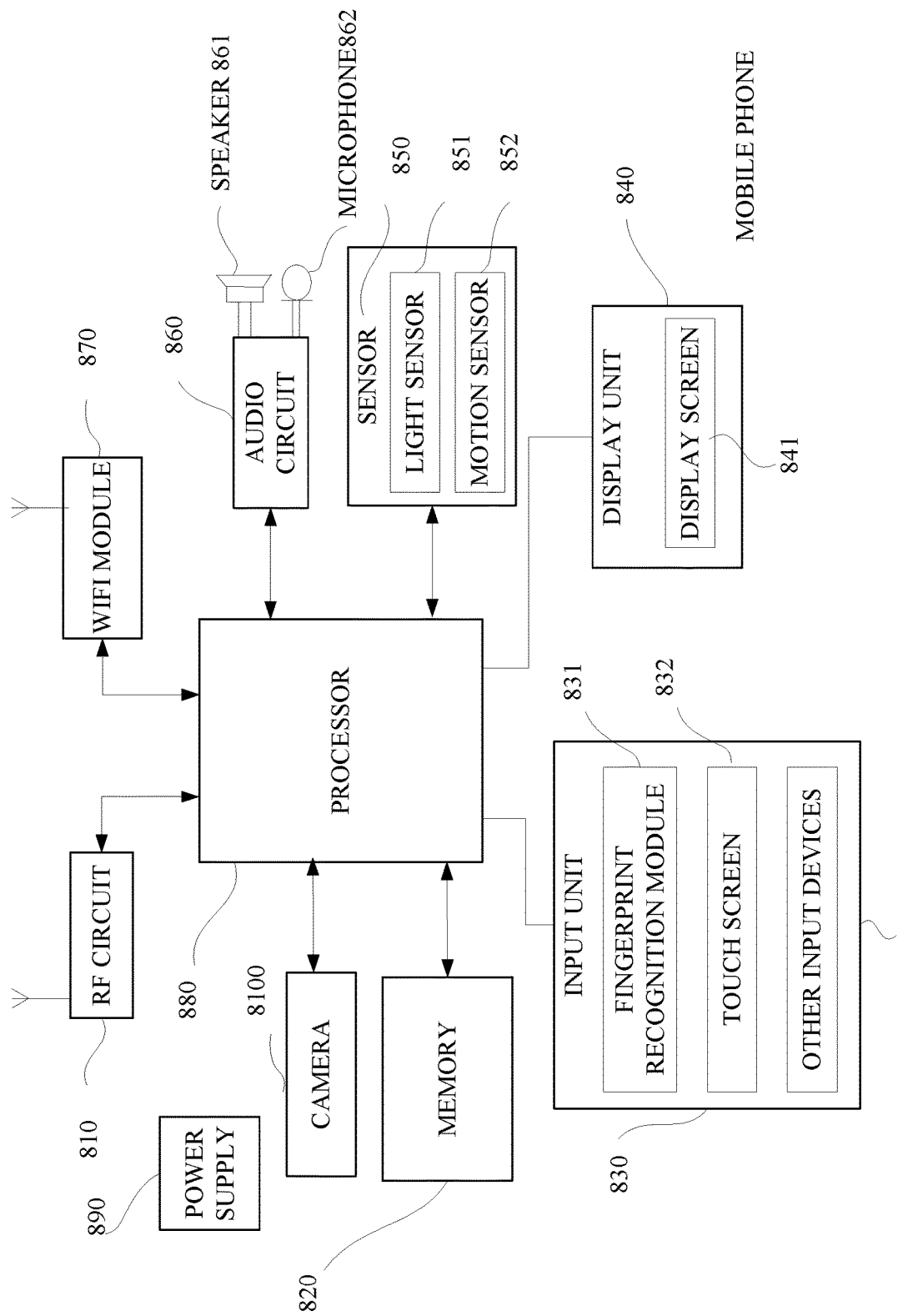
FIG. 8 is a schematic structural diagram illustrating still another mobile terminal according to an implementation of the present disclosure.

An implementation of the present disclosure further provides another terminal device. As illustrated in FIG. 8, only parts related to the implementations of the present disclosure are illustrated for ease of description. For technical details not described, reference may be made to the method implementations of the present disclosure. The terminal device may be any terminal device, such as a mobile phone, a tablet computer, a personal digital assistant (PDA), a point of sale terminal (POS), an on-board computer and the like. The following describes the mobile phone as an example of the terminal device.

FIG. 8 is a block diagram of a part of a structure of a mobile phone related to a terminal device according to an implementation of the present disclosure. As illustrated in FIG. 8, the mobile phone includes an RF (radio frequency) circuit 810, a memory 820, an input unit 830, a display unit 840, a sensor 850, an audio circuit 860, a Wi-Fi (wireless fidelity) module 870, a processor 880, a power supply 890 and other components. Those skilled in the art can understand that the structure of the mobile phone illustrated in FIG. 8 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 8.

The RF circuit 810 is configured to transmit or receive information. Generally, the RF circuit 810 includes but is not limited to an antenna, at least one amplifier, a transceiver, a coupler, a low noise amplifier (LNA), a duplexer, and the like. In addition, the RF circuit 810 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 820 is configured to store software programs and modules, and the processor 880 is configured to execute various function applications and data processing of the mobile phone by running the software programs and the modules stored in the memory 820. The memory 820 mainly includes a program storage area and a data storage area. The program storage area may store an operating system, application programs required for at least one function and so on. The data storage area may store data (such as usage parameters of an application) created according to use of the mobile phone, and so on. In addition, the memory 820 may include a high-speed RAM, and may further include a non-volatile memory such as at least one disk storage device, a flash device, or other non-volatile solid storage devices.

The input unit 830 may be configured to receive input digital or character information and generate key signal input associated with user setting and function control of the mobile phone. As one implementation, the input unit 830 may include a fingerprint recognition module 831, a touch screen 832, and other input devices 833. The fingerprint recognition module 831 can collect fingerprint data of the user. In addition to the fingerprint recognition module 831, the input unit 830 may further include other input devices 833. As one implementation, the other input devices 833 may include, but not limited to, one or more of a touch screen, a physical key, a function key (such as a volume control key, a switch key, etc.), a trackball, a mouse, a joystick, and the like.

The display unit 840 is configured to display information input by the user or information provided for the user or various menus of the mobile phone. The display unit 840 may include a display screen 841, and alternatively, the display screen 841 may be in the form of a liquid crystal display (LCD), an organic light-emitting diode (OLED) and so on. Although the fingerprint recognition module 831 and the display screen 841 are illustrated as two separate components in FIG. 8 to realize the input and output functions of the mobile phone, in some implementations, the fingerprint recognition module 831 may be integrated with the display screen 841 to implement the input and output functions of the mobile phone.

The mobile phone may also include at least one sensor 850, such as a light sensor 851, a motion sensor 852, and other sensors. As one implementation, the light sensor 851 may include an ambient light sensor and a proximity sensor, among which the ambient light sensor may adjust the brightness of the display screen 841 according to ambient lights, and the proximity sensor may turn off the display screen 841 and/or backlight when the mobile phone reaches nearby the ear. As a kind of motion sensor 852, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The audio circuit 860, the speaker 861, the microphone 862 may provide an audio interface between the user and the mobile phone. The audio circuit 860 may convert the received audio data into electrical signals and transfer the electrical signals to the speaker 861; thereafter the speaker 861 converts the electrical signals into sound signals to output. On the other hand, the microphone 862 converts the received sound signals into electrical signals, which will be received and converted into audio data by the audio circuit 860 to output. The audio data is then processed and transmitted by the processor 880 via an RF circuit 810 to another mobile phone for example, or, the audio data is output to the memory 820 for further processing.

Wi-Fi belongs to a short-range wireless transmission technology. With aid of the Wi-Fi module 870, the mobile phone may assist the user in E-mail receiving and sending, webpage browsing, access to streaming media and the like. Wi-Fi provides users with wireless broadband Internet access. Although the Wi-Fi module 870 is illustrated in FIG. 8, the Wi-Fi module 870 is not essential to the mobile phone and can be omitted according to actual needs without departing from the essential nature of the present disclosure.

The processor 880 is the control center of the mobile phone, it connects various parts of the whole mobile phone through various interfaces and lines, runs or executes software programs and/or modules stored in the memory 820, and invokes data stored in the memory 820 to perform various functions of the mobile phone and process data, thereby monitoring the mobile phone as a whole. In at least one implementation, the processor 880 may include one or more processing units; for example, the processor 880 may integrate an application processor and a modem processor, where the application processor handles the operating system, the user interface, the application, and so on, and the modem processor mainly processes wireless communication. It will be understood that the above-mentioned modem processor may not be integrated into the processor 880.

The mobile phone also includes a power supply 890 (e.g., a battery) that supplies power to various components. For instance, the power supply 890 may be logically connected to the processor 880 via a power management system to enable management of charging, discharging, and power consumption through the power management system.

The mobile phone further includes a camera 8100. The camera 8100 may include a front camera, an iris camera, and a rear camera.

Although not illustrated, the mobile phone may also include a Bluetooth module, flashlight, and the like. The flashlight can include a front flashlight and a rear flashlight, where the front flashlight can fill the front camera and the rear flashlight can fill the rear camera. The front flashlight can include a front visible flashlight and a front infrared flashlight, where the front visible flashlight is used to fill the front camera and the front infrared flashlight is used to fill the iris camera.

Implementations of the present disclosure also provide a computer readable storage medium. The computer readable storage medium stores computer programs for electronic data interchange which, when executed, are operable with a computer to execute all or part of the operations of any of the method for iris recognition described in the above-described method implementation.

Implementations of the present disclosure also provide a computer program product. The computer program product includes a non-transitory computer readable storage medium that stores computer programs. The computer programs are operable with a computer to perform all or part of the operations of any of the method for iris recognition described in the above method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for iris recognition, comprising:
   collecting a target black-and-white iris image through an iris camera and collecting a target color iris image through a front camera, when an iris collecting instruction is received;
   displaying the target color iris image in an iris recognition area of a display screen, wherein the target color iris image is configured to hint a user that a mobile terminal is performing iris recognition; and
   processing the target black-and-white iris image for iris recognition;
   wherein the collecting the target black-and-white iris image through the iris camera comprises:
      capturing a first black-and-white iris image through the iris camera when a visible flashlight is at a first power and when an infrared flashlight fills light, and a second black-and-white iris image through the iris camera when the visible flashlight is at a second power and when the infrared flashlight fills light;
      determining whether a second absolute value of a difference between an eyeball area ratio in the first black-and-white iris image and an eyeball area ratio in the second black-and-white iris image is greater than a second preset threshold; and
      determining an image with a larger eyeball area ratio from the first black-and-white iris image and the second black-and-white iris image as the target black-and-white iris image based on a determination that the second absolute value is greater than the second preset threshold;

wherein the method further comprises:
outputting a hint message indicating that an object under recognition is not a living body based on a determination that the second absolute value is less than the second preset threshold, where the hint message is configured to hint the user that the object under recognition is not a living body.

2. The method of claim 1, wherein, during the collecting the target color iris image through the front camera, the method further comprises:
collecting a face image of the user through the front camera; and
analyzing a facial expression of the user corresponding to the face image of the user; and
during the displaying the target color iris image in the iris recognition area of the display screen, the method further comprises:
displaying a background animation corresponding to the facial expression of the user in a background area of the display screen, wherein the iris recognition area does not overlap with the background area.

3. The method of claim 1, wherein the collecting the target color iris image through the front camera comprises:
capturing a first color iris image through the front camera when a visible flashlight is at a first power, and a second color iris image through the front camera when the visible flashlight is at a second power, wherein the first power is different from the second power;
determining whether a first absolute value of a difference between an eyeball area ratio in the first color iris image and an eyeball area ratio in the second color iris image is greater than a first preset threshold; and
determining an image with a larger eyeball area ratio from the first color iris image and the second color iris image as the target color iris image based on a determination that the first absolute value is greater than the first preset threshold.

4. The method of claim 3, further comprising:
after the determining whether the first absolute value is greater than the first preset threshold, displaying a hint message indicating that an object subjected to the iris recognition is not a living body based on a determination that the first absolute value is less than the first preset threshold.

5. The method of claim 1, wherein processing the target black-and-white iris image for the iris recognition comprises:
extracting and encoding iris features from the target black-and-white iris image;
comparing the iris features encoded with pre-stored iris feature codes; and
determining that the iris recognition is successful when the iris features encoded is matched with the pre-stored iris feature codes.

6. The method of claim 1, wherein processing the target black-and-white iris image for the iris recognition comprises:
processing the target black-and-white iris image to verify whether the target black-and-white iris image is a legal iris image; and
determining that the iris recognition is successful when the target black-and-white iris image is the legal iris image.

7. A mobile terminal, comprising:
an iris camera, configured to collect a target black-and-white iris image when an iris collecting instruction is received;
a front camera, configured to collect a target color iris image when the iris collecting instruction is received;
a display screen, configured to display the target color iris image in an iris recognition area of the display screen, wherein the target color iris image is configured to hint a user that the mobile terminal is performing iris recognition; and
an application processor (AP), configured to process the target black-and-white iris image for iris recognition;
wherein the mobile terminal further comprises: an infrared flashlight, and the iris camera configured to collect the target black-and-white iris image is further configured to:
capture a first black-and-white iris image when a visible flashlight is at a first power and when the infrared flashlight fills light and capture a second black-and-white iris image when the visible flashlight is at a second power and when the infrared flashlight fills light; and
the AP is further configured to:
determine whether a second absolute value of a difference between an eyeball area ratio in the first black-and-white iris image and an eyeball area ratio in the second black-and-white iris image is greater than a second preset threshold; and
determine an image with a larger eyeball area ratio from the first black-and-white iris image and the second black-and-white iris image as the target black-and-white iris image based on a determination that the second absolute value is greater than the second preset threshold;
wherein the AP is further configured to output a hint message indicating that an object under recognition is not a living body based on a determination that the second absolute value is less than the second preset threshold, where the hint message is configured to hint the user that the object under recognition is not a living body.

8. The mobile terminal of claim 7, wherein
the front camera is further configured to collect a face image of the user during collecting the target color iris image;
the AP is further configured to analyze a facial expression of the user corresponding to the face image of the user; and
the display screen is further configured to display a background animation corresponding to the facial expression of the user in a background area of the display screen during displaying the target color iris image in the iris recognition area of the display screen, wherein the iris recognition area does not overlap with the background area.

9. The mobile terminal of claim 8, wherein the AP configured to process the target black-and-white iris image to verify whether the target black-and-white iris image is the legal iris image is further configured to:
extract and encode iris features from the target black-and-white iris image;
compare the iris features encoded with pre-stored iris feature codes; and
determine that the iris recognition is the legal iris image when the iris features encoded is matched with the pre-stored iris feature codes.

10. The mobile terminal of claim 7, further comprising a visible flashlight,
wherein the front camera configured to collect the target color iris image is further configured to:

capture a first color iris image when the visible flashlight is at a first power and capture a second color iris image when the visible flashlight is at a second power, wherein the first power is different from the second power; and the AP is further configured to:

determine whether a first absolute value of a difference between an eyeball area ratio in the first color iris image and an eyeball area ratio in the second color iris image is greater than a first preset threshold; and determine an image with a larger eyeball area ratio from the first color iris image and the second color iris image as the target color iris image based on a determination that the first absolute value is greater than the first preset threshold.

11. The mobile terminal of claim 7, wherein the AP configured to process the target black-and-white iris image for the iris recognition is further configured to:

extract and encode iris features from the target black-and-white iris image;

compare the iris features encoded with pre-stored iris feature codes; and determine that the iris recognition is successful when the iris features encoded is matched with the pre-stored iris feature codes.

12. The mobile terminal of claim 7, wherein the AP configured to process the target black-and-white iris image for the iris recognition is further configured to:

process the target black-and-white iris image to verify whether the target black-and-white iris image is a legal iris image; and determine that the iris recognition is successful when the target black-and-white iris image is the legal iris image.

13. A mobile terminal, comprising an iris camera, a front camera, a display screen, an application processor (AP), and a memory, wherein the memory is configured to store one or more programs;

the one or more programs are configured to be executed by the AP; and the programs comprise instructions operable with the AP to:

receive an iris collecting instruction;

collect a target black-and-white iris image through an iris camera and collect a target color iris image through a front camera;

display the target color iris image in an iris recognition area of a display screen, wherein the target color iris image is configured to hint a user that a mobile terminal is performing iris recognition; and process the target black-and-white iris image for iris recognition;

wherein the programs further comprise instructions operable with the AP to:

collect a face image of the user through the front camera;

analyze a facial expression of the user corresponding to the face image of the user; and display a background animation corresponding to the facial expression of the user in a background area of the display screen, wherein the iris recognition area does not overlap with the background area.

14. The mobile terminal of claim 13, wherein the instructions operable with the AP to process the target black-and-white iris image for iris recognition is operable with the AP to:

extract and encoding iris features from the target black-and-white iris image;

compare the iris features encoded with pre-stored iris feature codes; and determine that the iris recognition is successful when the iris features encoded is matched with the pre-stored iris feature codes.

* * * * *